United States Patent
Huh et al.

(10) Patent No.: US 9,517,959 B2
(45) Date of Patent: Dec. 13, 2016

(54) MIXING APPARATUS FOR CRUSHING SLUDGE

(75) Inventors: Seung-Nyung Huh, Seoul (KR); Jin Nyung Huh, Gyunggi-Do (KR)

(73) Assignee: Ecolab USA Inc., St. Paul, MN (US)

( * ) Notice: Subject to any disclaimer, the term of this patent is extended or adjusted under 35 U.S.C. 154(b) by 475 days.

(21) Appl. No.: 13/961,361

(22) PCT Filed: Mar. 30, 2012

(86) PCT No.: PCT/EP2012/055881
§ 371 (c)(1),
(2), (4) Date: Oct. 30, 2013

(87) PCT Pub. No.: WO2012/131071
PCT Pub. Date: Oct. 4, 2012

(65) Prior Publication Data
US 2014/0042067 A1    Feb. 13, 2014

(30) Foreign Application Priority Data
Mar. 30, 2011    (KR) .................. 10-2011-0028873

(51) Int. Cl.
| | |
|---|---|
| *C02F 11/14* | (2006.01) |
| *B01F 7/00* | (2006.01) |
| *C02F 1/56* | (2006.01) |
| *B01F 15/00* | (2006.01) |

(52) U.S. Cl.
CPC .............. *C02F 11/14* (2013.01); *B01F 7/007* (2013.01); *B01F 7/00258* (2013.01); *B01F 7/00908* (2013.01); *B01F 2015/0011* (2013.01); *B01F 2015/00084* (2013.01); *C02F 1/56* (2013.01)

(58) Field of Classification Search
CPC ............ B01F 15/0203; B01F 15/00032; B01F 5/0218; B01F 5/104; B01F 7/007; B01F 7/00908; B01F 2015/00084; B01F 2015/0011; B01F 7/00258; C02F 11/14; C02F 1/56
USPC ............................................. 366/169.1–170.4
See application file for complete search history.

(56) References Cited

U.S. PATENT DOCUMENTS

| | | | | |
|---|---|---|---|---|
| 2,103,888 A | * | 12/1937 | Bowen .................. | B01F 7/007 137/47 |
| 3,482,520 A | * | 12/1969 | Larsen ................ | B01F 3/04539 261/87 |
| 3,774,887 A | * | 11/1973 | Dunn .................. | B01F 7/00816 366/170.4 |

(Continued)

FOREIGN PATENT DOCUMENTS

| | | | |
|---|---|---|---|
| DE | 4029824 | 3/1992 | |
| DE | 102010023793 A1 | * 12/2011 | .......... B01F 7/00125 |

(Continued)

*Primary Examiner* — Tony G Soohoo
(74) *Attorney, Agent, or Firm* — Fredrikson & Byron, P.A.

(57) ABSTRACT

The present invention relates to mixing apparatus for crushing sludge comprising a motor part in which a rotary shaft is inserted into the motor part and the motor part is rotated, a moving part formed to penetrate the motor part from one side to another side and move a chemical which is flowed through an outside chemical feeder to the another side, and a paddle mounted on the another side of the motor part to rotate based on the rotation of the motor part and spray the chemical.

10 Claims, 3 Drawing Sheets

(56) References Cited

U.S. PATENT DOCUMENTS

| | | | | |
|---|---|---|---|---|
| 3,899,159 | A * | 8/1975 | Nauta | B01F 15/0203 366/169.1 |
| 3,913,894 | A * | 10/1975 | McFarren | B01F 7/00908 366/169.1 |
| 4,168,918 | A * | 9/1979 | de Jonge | B08B 9/093 366/138 |
| 4,215,543 | A | 8/1980 | Miller | |
| 4,321,818 | A | 3/1982 | Bessho | |
| 4,511,255 | A * | 4/1985 | Saucier | B01F 7/00725 366/138 |
| 4,944,669 | A | 7/1990 | Zakich | |
| 5,193,908 | A * | 3/1993 | Rescorla | B01F 7/24 261/119.1 |
| 5,362,148 | A * | 11/1994 | Lehrke | B01F 15/0291 366/191 |
| 6,240,758 | B1 | 6/2001 | Nagakura | |
| 6,523,992 | B1 * | 2/2003 | Bublewitz | A61C 5/064 222/145.6 |
| 7,252,429 | B2 * | 8/2007 | Yungblut | B01F 3/12 366/169.1 |
| 7,320,541 | B2 * | 1/2008 | Wagner | B01F 7/00141 222/145.6 |
| 2004/0223404 | A1 | 11/2004 | Hughes | |
| 2005/0286984 | A1 | 12/2005 | Weise | |
| 2013/0148466 | A1 * | 6/2013 | Gramann | A61C 9/0026 366/182.2 |
| 2014/0042067 | A1 * | 2/2014 | Huh | B01F 7/00258 210/205 |

FOREIGN PATENT DOCUMENTS

| | | |
|---|---|---|
| EP | 116024 | 8/1984 |
| EP | 1815972 | 8/2007 |
| WO | WO2009065509 | 5/2009 |
| WO | WO2012104384 | 8/2012 |
| WO | WO2012131071 | 10/2012 |

* cited by examiner

MIXING APPARATUS FOR CRUSHING SLUDGE

CROSS-REFERENCE TO RELATED APPLICATIONS

This application is a 35 U.S.C. §371 U.S. National Stage of PCT/EP2012/055881, filed Mar. 30, 2012, which claims priority to Korean Patent Application No. KR 10-2011-0028873, filed Mar. 30, 2011.

BACKGROUND OF THE INVENTION

1. Field of the Invention

The present invention relates to a mixing apparatus for crushing sludge.

2. Background

In general, in order to remove floating matters contained in waste water and water through coagulation and sedimentation, a chemical (coagulant) is fed into the waste water and the like to cause a coagulation reaction.

Through the coagulation reaction, a flock is formed coagulated by a coagulant such as a particle of an organic matter and a microbe or a suspended material of the waste water and the like. For the flock formation in the precipitation tank, the thickener tank, and the like, the chemical (coagulant) is fed into a pipe or the chemical (coagulant) is fed separately into the precipitation tank, the thickener tank, and the like in general In the case of the abovementioned typical method, raw water (sludge) and the chemical (coagulant) are not agitated appropriately, and the flock is formed insufficiently, which leads to an overfeeding of the chemical during the flock formation.

In the case of a belt press dehydrator for a sludge dehydration process, an agitator of a quadrangular agitation tank at a front rotates at a slow speed to carry out agitation. In this case, sufficient time is not provided for the raw water (sludge) and the chemical (coagulant) to react with each other, and sizes of the formed flocks are irregular and large, hindering an even distribution at the belt press dehydrator.

Also, adequate agitation is unlikely while the flock stays in the agitator, which leads to the overfeeding of the chemical during the dehydration process. Therefore, a filter cloth is clogged, water filtering performance is lowered, and an increase in water content becomes unavoidable.

A centrifugal dehydrator feeds the chemical by connecting a raw water (sludge) pipe leading to the belt press dehydrator with a chemical (coagulant) pipe. A simultaneous feeding into the belt press dehydrator is made, and the flock formation and dehydration is conducted by a turning force of the centrifugal dehydrator. Since the coagulation reaction is carried out in the belt press dehydrator, the reaction is made inadequately before discharge, meaning that the water content is maintained higher than a design value during operation, and operation efficiency of the dehydrator drops due to the flock formation based on the overfeeding of the chemical The problem to be solved by the present invention is to provide a new mixing apparatus for crushing sludge, preferably installed at a raw water (sludge) pipe to mix raw water (sludge) with a chemical (coagulant) in a precipitation tank, a thickener tank, a thickener, and a dehydration process at a filtration plant, a waste water disposal plant, etc.

This problem is solved by a mixing apparatus according to claim 1. Advantageous and/or preferred embodiments can be obtained from the dependent claims.

In particular, a mixing apparatus for crushing sludge according to the invention may include a motor part in which a rotary shaft is inserted into the motor part and the motor part is rotated, a moving part formed to penetrate the motor part from one side to another side and move a chemical which is flowed through an outside chemical feeder to the another side, and a paddle mounted on the another side of the motor part to rotate based on the rotation of the motor part and spray the chemical.

The paddle may have a moving hole which the chemical moves inside, a discharge hole connected to the moving hole and discharging the chemical outside, and a saw-toothed part projecting outside.

An inner wall surface of the discharge hole and a corner of the saw-toothed part of the paddle may be formed sharply.

The motor part may include a main body in which the rotary shaft is inserted into the main body, a first plate combined with one side of the main body and one outer circumference of the shaft, and a second plate combined with another side of the main body and another outer circumference of the shaft.

The shaft may have a penetrating path inside to move the chemical fed at one side to another side.

The first plate may include a first bearing part combined with an outer circumference of the shaft, a first sealing part combined to surround the first bearing part, and an inlet part formed in the first sealing part and allowing the chemical fed from outside to flow to a penetrating path of the shaft.

The first sealing part may be a mechanical seal.

The second plate may include a second bearing part combined with an outer circumference of the shaft, a second sealing part combined to surround the second bearing part around an outer circumference of the second bearing part, and a securing part surrounding the second bearing part and the second sealing part, and securing the second bearing part and the second sealing part to the another side of the motor part.

The second sealing part may be a mechanical seal.

The moving part may include an inlet part formed on the first plate and allowing the chemical to flow in, a penetrating path formed in the shaft of the motor part, and a moving hole formed in the paddle.

The mixing apparatus may be installed, in particular vertically, at a raw water (sludge) pipe to mix raw water (sludge) with a chemical (coagulant) in a precipitation tank, a thickener tank, a thickener, and a dehydration process at a filtration plant, a waste water disposal plant, etc.

According to the present invention, dehydrator efficiency is raised and water content of a dehydration cake is lowered since a microbial cell is destroyed by a corner of a saw-toothed part of a rotating paddle while cavitation is induced to remove moisture contained in the microbial cell.

Further, since agitation is conducted by the paddle rotating at a high speed in a narrow pipe, an even and solid flock is made by using a proper amount of chemical (coagulant) so that the chemical (coagulant) is saved compared to a previous chemical (coagulant) feeding method. Sludge sedimentation and thickening efficiency improves, and overall efficiency of water purification and waste water treatment increases.

DETAILED DESCRIPTION FOR CARRYING OUT THE INVENTION

Figure 1:
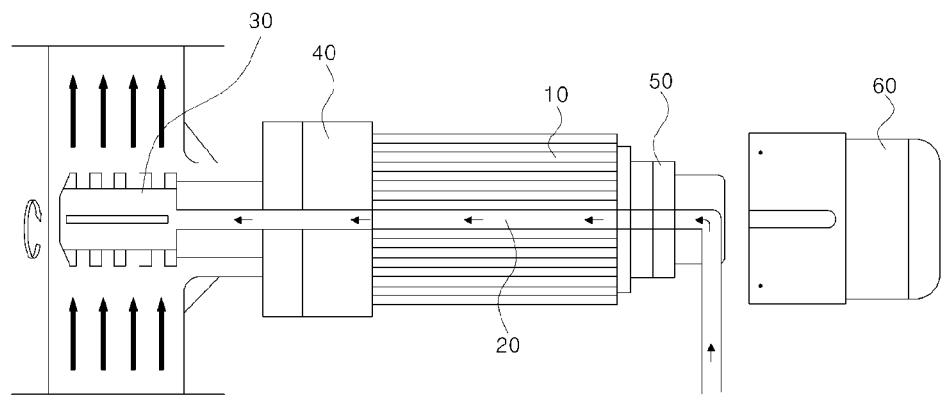
FIG. 1 is a general view of a mixing apparatus for crushing sludge according to the present invention

Hereinafter, the present invention will be described in detail by explaining preferred embodiments of the invention with reference to the attached drawings. Like reference numerals in the drawings denote like elements. Moreover, detailed descriptions related to well-known functions or configurations will be ruled out in order not to unnecessarily obscure subject matters of the present invention.

Figure 2:
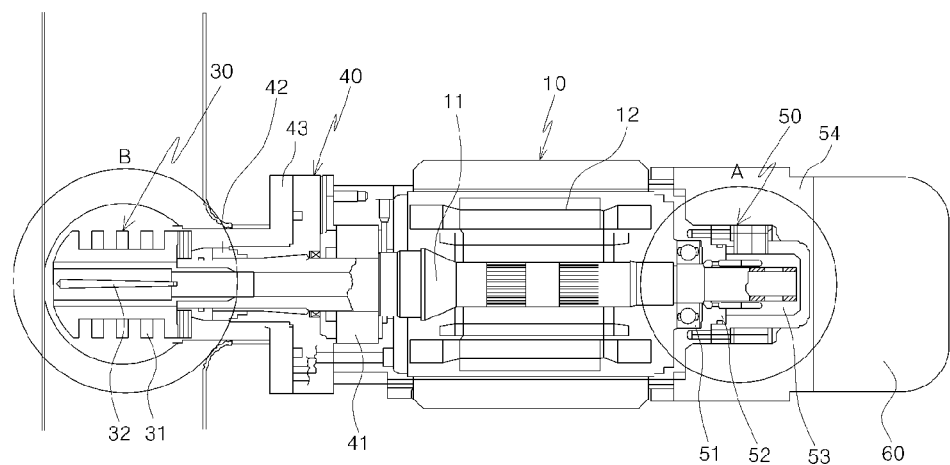
FIG. 2 is a sectional view of the mixing apparatus for crushing sludge according to the present invention

With reference to FIGS. 1 and 2, a mixing apparatus for crushing sludge of the present invention includes a motor part 10, a moving part moving a chemical, a paddle 30 disposed at another side of the motor part 10 to spray the chemical while rotating, a cooling fan 60 disposed at a side of the motor part 10 to cool the motor part 10.

The motor part 10 includes a shaft 11 inserted into an inside of a main body 11, and first and second plates 40 and 50 coupled with both ends of the shaft 11. The cooling fan 60 is disposed at the side of the motor part 10 to cool the motor part 10.

The moving part includes an inlet part 53, disposed at a first sealing part 52 of the first plate 50 so that the chemical (coagulant) flows in through the inlet part 53, a penetrating path disposed at the shaft 11 of the motor part 10, and a moving hole formed in the paddle 30.

The moving part may form the inlet part 53 at the second plate 40.

The shaft 11 rotates in the main body 11. The penetrating path is formed inside in a length direction, and an inlet hole connected to the penetrating path is formed at one side end outer circumference.

The first plate 50 is coupled with a side of the shaft 11, and the second plate 40 is coupled with another side.

Figure 3:
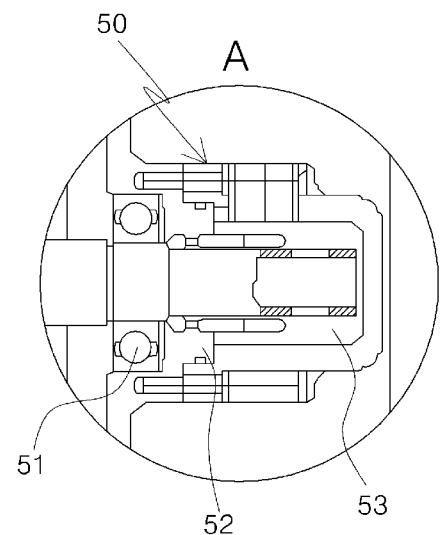
FIG. 3 is an enlarged view showing portion A of FIG. 2

With reference to FIG. 3, the first plate 50 includes a first bearing part 51 coupled with one outer circumference of the shaft, the first sealing part 52 surrounding and coupled with the first bearing part 51, and the inlet part 53 disposed in the first sealing part 52.

The first bearing part 51 is disposed between the shaft 11 and the first sealing part 52 so that the shaft 11 rotates smoothly.

The first sealing part 52 conducts sealing so that the chemical, which may leak out of the inlet part 53 disposed inside, does not leak out.

The first sealing part 52 may be a mechanical seal.

Here, the first sealing part 52 may be the mechanical seal because there is an automatic control function not to affect sealing performance even when a sealing material is worn out to a certain extent through friction.

In addition, a leap seal, a grand packing, and a leakage seal may be used for the first sealing part 52.

The inlet part 53 disposed in the first sealing part 52 feeds the chemical supplied from an external chemical feeder into the penetrating path through the inlet hole of the shaft 11.

A cover part 54 is disposed at an exterior of the first sealing part 52 to protect the first sealing part 52.

The second plate 40 includes a second bearing part 41 coupled with the other outer circumference of the shaft 11, a second sealing part 42 surrounding and coupled with the second bearing part 41, and a securing part surrounding and fixing the second bearing part 41.

The second bearing part 41 is disposed between the shaft 11 and the second sealing part 42 so that the shaft 11 rotates smoothly.

The second sealing part 42 is coupled with another side of the shaft 11, surrounds and is coupled with the second bearing part 41, and conducts sealing so that the chemical does not leak out of the another side of the shaft 11.

The second sealing part 42 may be the mechanical seal.

Here, the second sealing part 42 may be the mechanical seal because there is the automatic control function, as is the case of the first sealing part 52, not to affect the sealing performance even when the sealing material is worn out to the certain extent through the friction.

In addition, the leap seal, the grand packing, and the leakage seal may be used for the second sealing part 42.

The securing part is coupled with an outer side of the second sealing part 42 to fix the second sealing part 42 at another side of the main body 11.

The paddle 30 is coupled with another side of the second plate 40.

Figure 4:
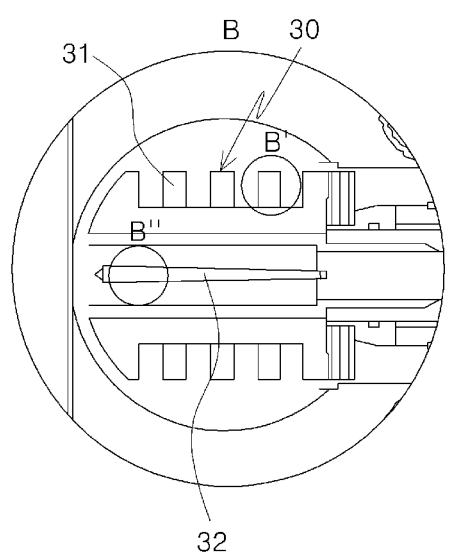
FIG. 4 is an enlarged view showing portion B of FIG. 2

With reference to FIG. 4, the paddle 30 is connected to another side of the shaft 11. A moving path is disposed in the paddle 30, and the moving path is connected to the penetrating path of the shaft 11 so that the chemical is fed into the paddle 30.

A discharge hole 32 is formed at an outer circumference of the paddle 30 so that the chemical moving through the moving path is discharged.

A plurality of saw-toothed parts 31 is disposed at the outer circumference of the paddle 30 in the length and outside direction to crush the sludge while the paddle 30 is rotating and form a flock by mixing the chemical with the sludge.

The discharge hole 32 and the saw-toothed part 31 have a sharply formed corner because the corner of the discharge hole 32 and the saw-toothed part 31 may crush a microbe in the sludge and increase flock formation while the paddle 30 rotates and increases cavitation. By crushing the microbe hindering coagulation, coagulation efficiency improves and moisture contained in a cell of the microbe is discharged.

Here, the cavitation is defined as creation of a space devoid of water, occurring when a low-pressure zone is formed in a fluid and a gas contained in the water escapes the water to be collected at the low-pressure zone.

According to the present invention, a hollow space is temporarily created in a fluid around the paddle due to high-speed rotation of the paddle, and a vacuum zone or a low-pressure zone is created temporarily. The zone is called cavity part.

Figure 5:
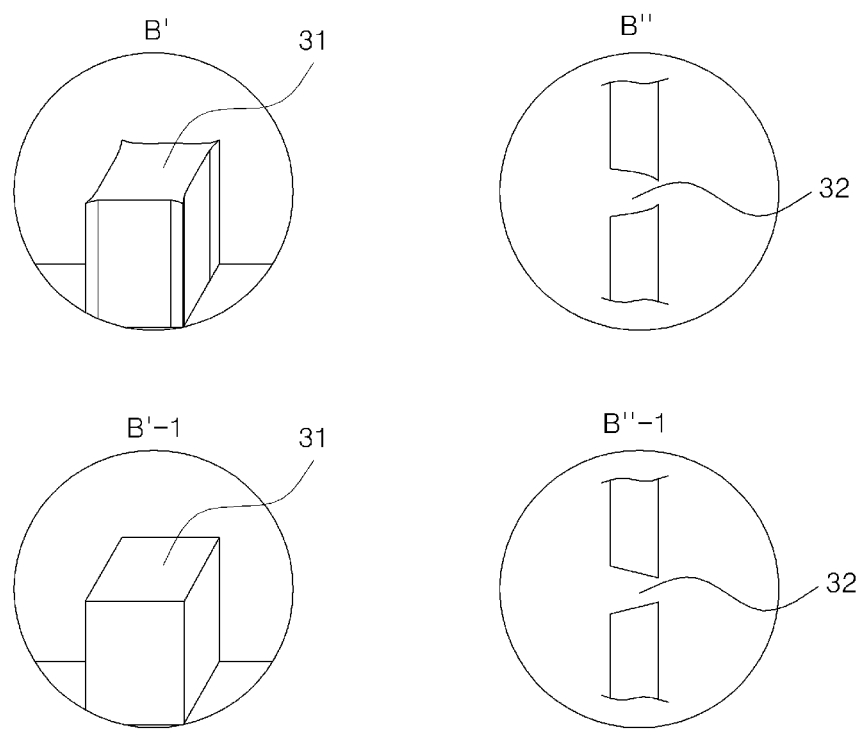
FIG. 5 is enlarged views showing portions B' and B" of FIG. 4.
Figure 6:
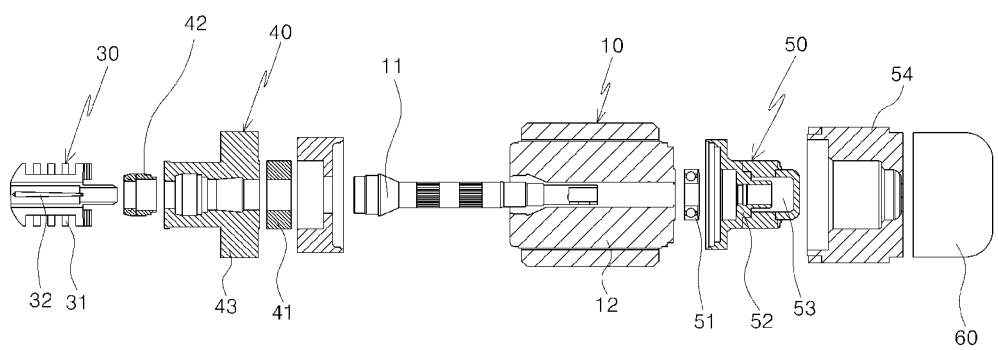
FIG. 6 is an exploded view of the mixing apparatus for crushing sludge according to the present invention.

With reference to FIG. 5, the corner of the discharge hole 32 and the saw-toothed part 31 may be blade-shaped or perpendicular.

The paddle 30 rotates at a velocity between 2,500 revolutions per minute (RPM) and 4,500 RPM.

Here, the paddle 30 may rotate at the velocity between 3,000 RPM and 4,000 RPM.

The present invention is explained in greater detail below.

The motor part 10 includes the main body 11 in which the shaft 11 is coupled and rotates, the first plate 50 coupled with the side of the shaft 11, and the second plate 40 coupled with the another side of the shaft 11.

The paddle is coupled with another side of the second plate 40.

The paddle 30 is connected to the shaft 11, rotates with the shaft 11 when the shaft 11 rotates, and crushes the sludge and forms the flock through the rotation.

When the chemical supplied from the external chemical feeder is fed into the inlet part 53 disposed in the first sealing part 52, the chemical is moved to the another side through the penetrating path disposed in the length direction of the shaft 11. Here, the first bearing part 51 is disposed between the first sealing part 52 and the shaft 11 so that the shaft 11 rotates smoothly.

The chemical moved through the penetrating path of the shaft 11 is discharged out of the discharge hole 32 through the moving hole of the paddle 30 connected to the another side of the shaft 11.

The second sealing part 42 is disposed at a joint between the shaft 11 and the paddle 30 so that the chemical is does not leak out. The second bearing part 41 is disposed between the securing part surrounding and fixing the outer side of the second sealing part 42 and the shaft 11 so that the shaft 11 rotates smoothly.

The chemical discharged out of the discharge hole 32 is mixed with the sludge and the flock is formed while the paddle 30 rotates.

The saw-toothed parts 31 are disposed in the outside direction at the outer circumference of the paddle 30 so that the flock is formed smoothly. The saw-toothed parts 31 crush a microbial cell in the sludge colliding during the rotation so that the moisture contained in the microbial cell is discharged.

Here, the cavitation occurs around the paddle 30 due to the rotation of the paddle 30, and the moisture contained in the crushed microbial cell is squeezed.

According to the present invention, dehydrator efficiency is raised and water content of a dehydration cake is lowered since the microbial cell is destroyed by the corner of the saw-toothed part of the rotating paddle while the cavitation is induced to remove the moisture contained in the microbial cell.

Further, since agitation is conducted by the paddle rotating at a high speed in a narrow pipe, an even and solid flock is made by using a proper amount of the chemical (coagulant) so that the chemical (coagulant) is saved compared to a previous chemical (coagulant) feeding method. Sludge sedimentation and thickening efficiency improves, and overall efficiency of water purification and waste water treatment increases.

While this invention has been particularly shown and described with reference to preferred embodiments thereof, it will be understood by those skilled in the art that various changes in form and details may be made therein without departing from the spirit and scope of the invention as defined by the appended claims. The scope of the invention is defined not by the detailed description of the invention but by the appended claims, and all differences within the scope will be construed as being included in the present invention.

DESCRIPTION OF THE SYMBOLS

10 Motor Part
11 Shaft
12 Main Body
20 Moving Part
30 Paddle
31 Saw-toothed Part
32 Discharge Hole
40 Second Plate
41 Second Bearing Part
42 Second Sealing Part
43 Securing Part
50 First Plate
51 First Bearing Part
52 First Sealing Part
53 Inlet Part
54 Cover Part
60 Cooling Fan

We claim:

1. A mixing apparatus for crushing sludge comprising:
a motor part having a rotary shaft inserted into the motor part and penetrating the motor part from a first side to a second side, the motor part configured to rotatably drive the shaft,
a moving part defining a penetrating path, the moving part formed to penetrate the motor part from a first side to a second side and move a chemical which is fed by an outside chemical feeder to the second side;
a paddle comprising a first saw-toothed part projecting out from the paddle, the paddle operably mounted to rotate with the shaft on the second side of the motor part, wherein the paddle is in communication with the penetrating path and configured to discharge the chemical from the moving part when rotated,
wherein the motor part comprises:
a main body in which the rotary shaft is inserted;
a first plate combined with the first side of the main body and one outer circumference of the shaft; and
a second plate combined with the second side of the main body and another outer circumference of the shaft,
wherein the second plate comprises:
a second bearing part combined with an outer circumference of the shaft;
a second sealing part combined to surround the second bearing part around an outer circumference of the second bearing part; and
a securing part surrounding the second bearing part and the second sealing part, and securing the second bearing part and the second sealing part at or to the second side of the motor part.

2. The mixing apparatus for crushing sludge according to claim 1, wherein the paddle has a moving hole through which the chemical moves inside the paddle, and a discharge hole connected to the moving hole, the discharge hole configured to discharge the chemical to the outside when the paddle is rotated.

3. The mixing apparatus for crushing sludge according to claim 2, wherein an inner wall surface of the discharge hole is formed sharply.

4. The mixing apparatus for crushing sludge according to claim 1, wherein the first plate comprises:
a first bearing part combined with an outer circumference of the shaft;
a first sealing part combined to surround the first bearing part; and
an inlet part formed in the first sealing part and allowing the chemical fed from outside to flow to the penetrating path of the shaft.

5. The mixing apparatus for crushing sludge according to claim 4, wherein the first sealing part is a mechanical seal.

6. The mixing apparatus for crushing sludge according to claim 1, wherein the second sealing part is a mechanical seal.

7. The mixing apparatus for crushing sludge according to claim 1, wherein the moving part comprises:
an inlet part formed on the first plate and allowing the chemical to flow in;
the penetrating path formed in the shaft; and
a moving hole formed in the paddle.

8. The mixing apparatus for crushing sludge according to claim 1, wherein the saw-toothed part projecting out from the paddle includes a first end attached to the paddle and a second end opposite the first end, the second end including a perpendicular corner.

9. The mixing apparatus for crushing sludge according to claim 1, wherein the saw-toothed part projecting out from the paddle includes a first end attached to the paddle and a second end opposite the first end, the second end including a blade-shaped corner.

10. The mixing apparatus for crushing sludge according to claim 1, further comprising a second saw-toothed part projecting out from the paddle, wherein the first and second saw-toothed parts are aligned along an axis extending parallel to a central longitudinal axis of the paddle, and wherein the first and second saw-toothed parts define an axial space therebetween.

* * * * *